(12) United States Patent
Yu

(10) Patent No.: US 7,093,894 B2
(45) Date of Patent: Aug. 22, 2006

(54) BICYCLE SADDLE HAVING PNEUMATIC CUSHIONS

(76) Inventor: Tsai-Yun Yu, No. 412, Ta An Kang Rd., Ta Chia Chien, Taichung Hsien (TW)

( * ) Notice: Subject to any disclaimer, the term of this patent is extended or adjusted under 35 U.S.C. 154(b) by 198 days.

(21) Appl. No.: 10/887,903

(22) Filed: Jul. 12, 2004

(65) Prior Publication Data

US 2006/0006706 A1    Jan. 12, 2006

(51) Int. Cl.
*B62J 1/26* (2006.01)

(52) U.S. Cl. .................................. 297/200; 297/452.41

(58) Field of Classification Search ................ 297/199, 297/200, 452.41
See application file for complete search history.

(56) References Cited

U.S. PATENT DOCUMENTS

| 633,142 | A | * | 9/1899 | Monahan | ................ 297/200 X |
|---|---|---|---|---|---|
| 1,358,315 | A | * | 11/1920 | Joel | ............................. 297/199 |
| 3,558,187 | A | * | 1/1971 | Morse | ........................ 297/199 |
| 5,775,710 | A | | 7/1998 | Yu | |
| 6,305,743 | B1 | * | 10/2001 | Wheeler | ................. 297/199 X |
| 6,443,524 | B1 | | 9/2002 | Yu | |
| 2005/0029842 | A1 | * | 2/2005 | Martin et al. | ................ 297/199 |

* cited by examiner

*Primary Examiner*—Anthony D. Barfield
(74) *Attorney, Agent, or Firm*—Birch, Stewart, Kolasch & Birch, LLP

(57) ABSTRACT

A bicycle saddle includes a saddle shell, a frame and two pneumatic cushions. The saddle shell has a relatively narrower front end and a relatively wider rear end. The frame has a relatively narrower front end connected to a bottom side of the front end of the saddle shell, and a relatively wider rear end located below the rear end of the saddle shell. The pneumatic cushions are spacedly disposed between a bottom side of the rear end of the saddle shell and the rear end of the frame. The pneumatic cushions each have an enclosed chamber that is filled with gas.

12 Claims, 5 Drawing Sheets

BICYCLE SADDLE HAVING PNEUMATIC CUSHIONS

BACKGROUND OF THE INVENTION

1. Field of the Invention

The present invention relates to a bicycle saddle and more specifically, to a bicycle saddle that is equipped with two pneumatic cushions.

2. Description of the Related Art

Metal coil springs are widely used in the conventional bicycle saddles for absorbing the shock brought about by the bicycle in motion. The metal coil springs are generally disposed between the underside of the saddle shell and the supporting frame that is connected to the seat post of the bicycle. This conventional design is defective in that the coil springs are not effective in absorbing shock and too heavy. In addition, the metal coil springs are apt to make noise when the coil springs are compressed and decompressed.

U.S. Pat. No. 5,775,710 discloses an improved bicycle saddle having two resilient members made of elastomeric material, such as polyurethane. U.S. Pat. No. 6,443,524 also discloses a bicycle saddle installed with two block bodies made of a plastic foam material, such as a microcellular polyurethane elastomer. The resilient members and the block bodies respectively disclosed in the aforementioned patents are more effective in absorbing shock and lighter in weight in comparison with the above-mentioned metal coil springs. Further, no noise is made when they are compressed and decompressed. However, since the resilient members and the block bodies are solid, their shock-absorbing effects are still insufficient and their weights are still too heavy.

SUMMARY OF THE INVENTION

It is the primary objective of the present invention to provide a bicycle saddle having pneumatic cushions to absorb shock effectively.

It is another objective of the present invention to provide a bicycle saddle having pneumatic cushions which are light in weight.

To achieve the above objectives of the present invention, the bicycle saddle provided by the present invention comprises a saddle shell, a frame and two pneumatic cushions. The saddle shell has a relatively narrower front end and a relatively wider rear end. The frame has a relatively narrower front end firmly connected to a bottom side of the front end of the saddle shell, and a relatively wider rear end located below a bottom side of the rear end of the saddle shell. The pneumatic cushions are spacedly disposed between the bottom side of the rear end of the saddle shell and the rear end of the frame. The pneumatic cushions each have an enclosed chamber that is filled with gas.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitive of the present invention, and wherein.

DETAILED DESCRIPTION OF THE INVENTION

Figure 1:
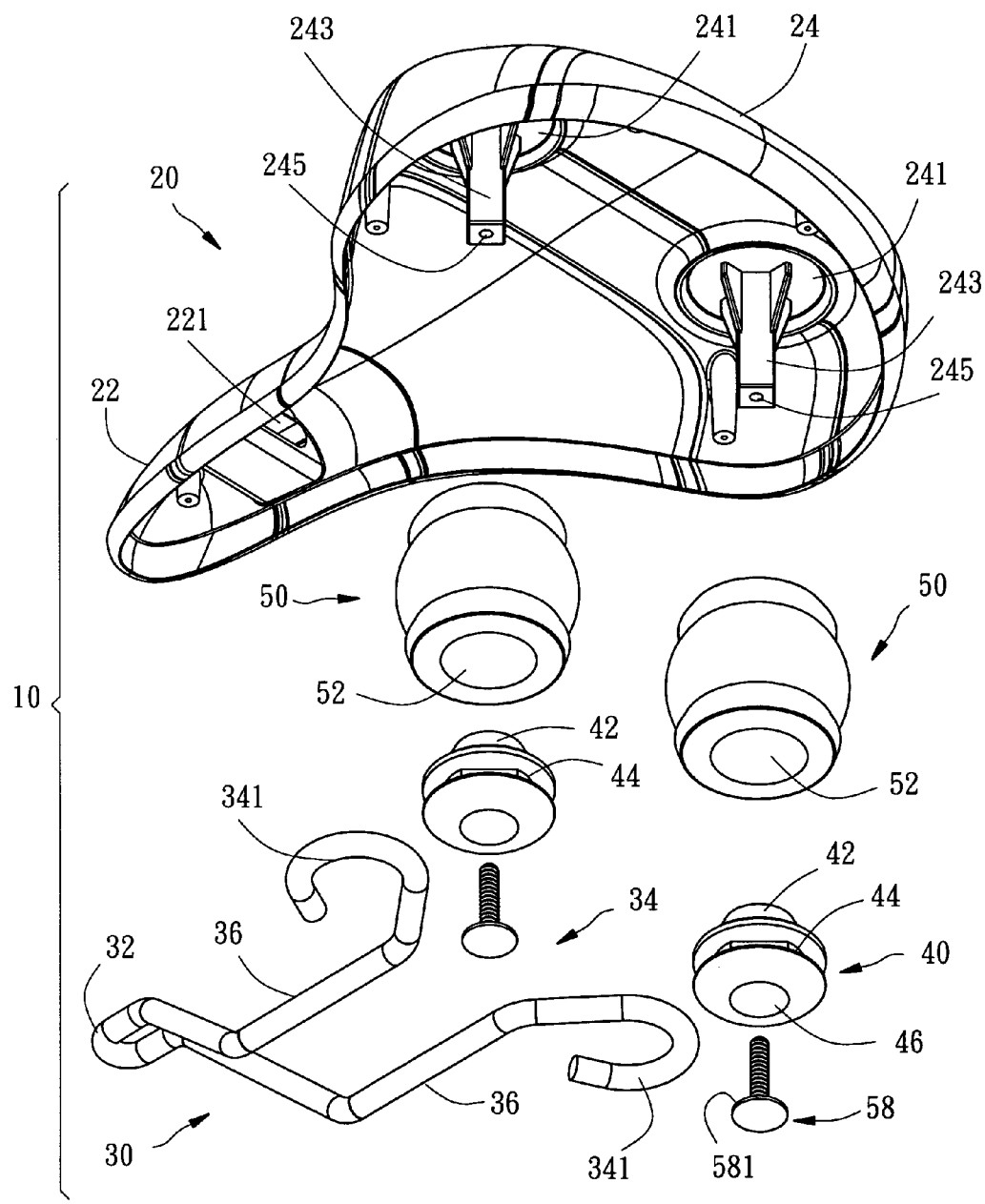
FIG. 1 is an exploded view of a first preferred embodiment of the present invention.

As shown in FIG. 1 to FIG. 4, the bicycle saddle 10 provided by the first preferred embodiment of the present invention comprises a saddle shell 20, a frame 30, two mounting members 40 and two pneumatic cushions 50.

The saddle shell 20 on which a covering (not shown) is covered is made of rigid plastic and has a relatively narrower front end 22 and a relatively wider rear end 24. The bottom side of the front end 22 is provided with a mounting socket 221 having an opening that faces backwards. The bottom side of the rear end 24 is provided at two lateral sides thereof with two locating recesses 241. Two mounting posts 243 protrude downwardly respectively from the locating recesses 241 of the bottom side of the rear end 24. Each of the mounting posts 243 has a threaded hole 245 extending upwardly from a bottom end thereof.

The frame 30 is formed by bending a metal rod and has a U-shaped narrow front end 32, a wide rear end 34 and two arms 36, which are to be mounted on a seat post of a bicycle (not shown), between the front end 32 and the rear end 34. The U-shaped front end 32 of the frame 30 is inserted into the socket 221 of the front end 22 of the saddle shell 20 so that the rear end 34 of the frame 30 is suspendedly located below the rear end 24 of the saddle shell 20. The rear end 34 of the frame 30 is provided at two lateral sides thereof with two hook portions 341.

The mounting members 40 each have a plug portion 42 at an end, an annual peripheral groove 44 at a peripheral wall thereof, a through hole 46 through top and bottom sides thereof, and a stop fringe 48 protruded into the through hole 46. The hook portions 341 of the frame 30 are respectively hooked on the peripheral walls of the two mounting members 40 and positioned in the peripheral grooves 44 of the mounting members 40 respectively so that the mounting members 40 are firmly located at the two lateral sides of the rear end 34 of the frame 30.

Figure 2:
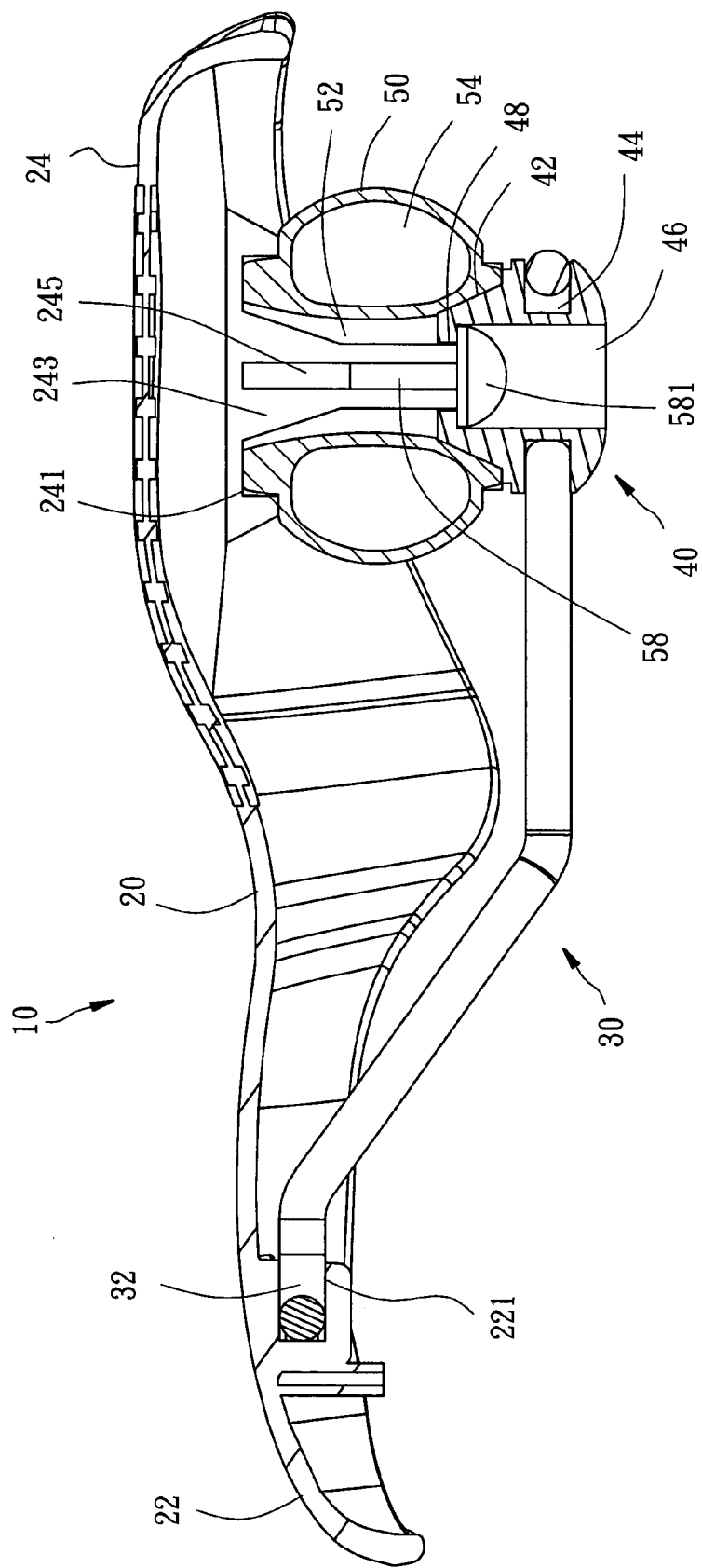
FIG. 2 is a sectional view of the first preferred embodiment of the present invention.
Figure 3:
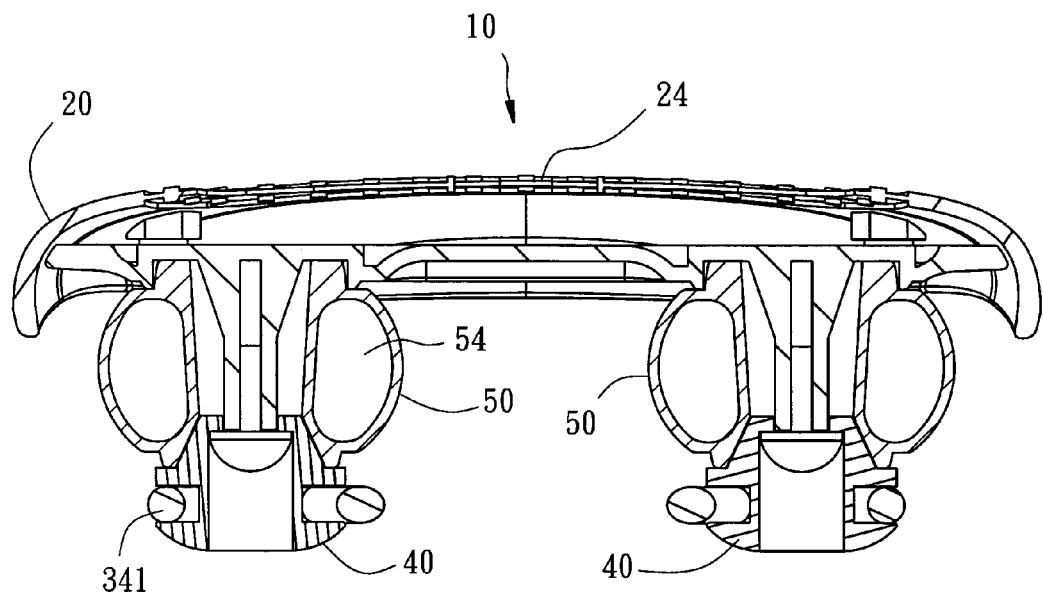
FIG. 3 is another sectional view of the first preferred embodiment of the present invention.

The pneumatic cushions 50 each have a tubular cushion body made of rubber in this embodiment; alternatively, they can be made of other elastic materials, such as elastomer, polyurethane, etc. The pneumatic cushions 50 each have an axial through hole 52 through top and bottom sides thereof, and an enclosed airtight chamber 54 which is defined in between the outer and inner peripheral walls and the top and bottom sides and filled with gas, such as air and inert gas. As shown in FIGS. 2 and 3, the pneumatic cushions 50 are respectively disposed at between the rear end 24 of the saddle shell 20 and the two mounting members 40, and the top sides of the pneumatic cushions 50 are respectively located and received in the locating recesses 241 of the saddle shell 20. The mounting post 243 of the saddle shell 20 and the plug portion 42 of the mounting member 40 are respectively inserted into the through hole 52 from top and bottom openings of the through hole 52, and the mounting post 243 extends further into the through hole 46 of the mounting member 40. Two screws 58 are respectively inserted into the through holes 46 of the mounting members 40 and threaded respectively into the threaded holes 245 of the mounting posts 243 with the screw heads 581 thereof stopped respectively against the stop fringes 48 of the mounting members 40 such that the cushion member 50 is sandwiched between the rear end 24 of the saddle shell 20 and the rear end 34 of the frame 30.

Figure 4:
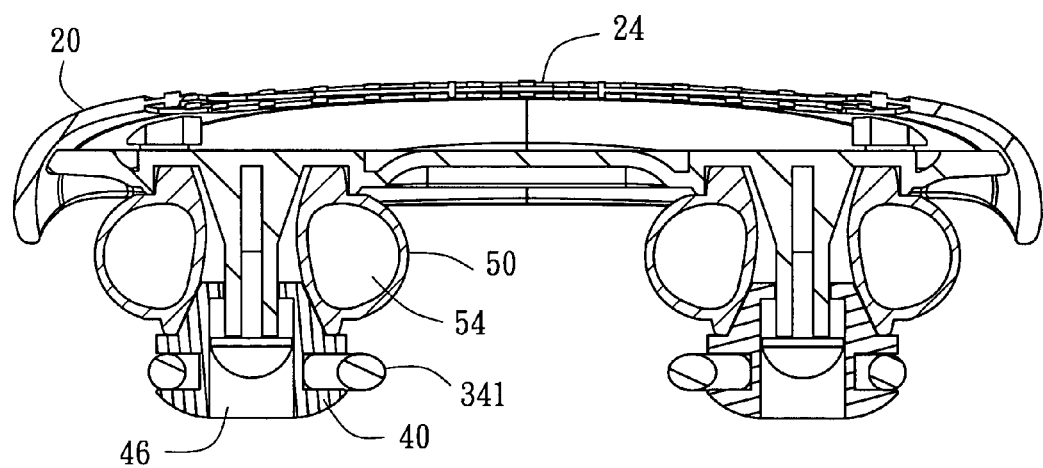
FIG. 4 is similar to FIG. 3 but showing that the pneumatic cushions are compressed.

When in use, the bicycle saddle 10 of the present invention is mounted on the bicycle seat post (not shown) by means of a mount (not shown) which holds securely the two arms 36 of the frame 30. As shown in FIG. 4, when an external force is acted downwardly on the saddle shell 20, the rear end 24 of the saddle shell 20 will move downwardly toward the rear end 34 of the frame 30, that is, the mounting posts 243 move downwardly respectively in the through holes 46 of the mounting members 40, such that the pneumatic cushions 50 are compressed and deformed to absorb the impact. As soon as the pneumatic cushions 50 are relieved of the external force exerting thereon, the compressed pneumatic cushions 50 return to their original shape, as shown in FIG. 3. Since the enclosed airtight chamber 54 of the pneumatic cushion 50 is filled with gas, the pneumatic cushion 50 provided by the present invention is light in weight, absorbs shock efficiently, and makes no noise when it is compressed and decompressed.

Figure 5:
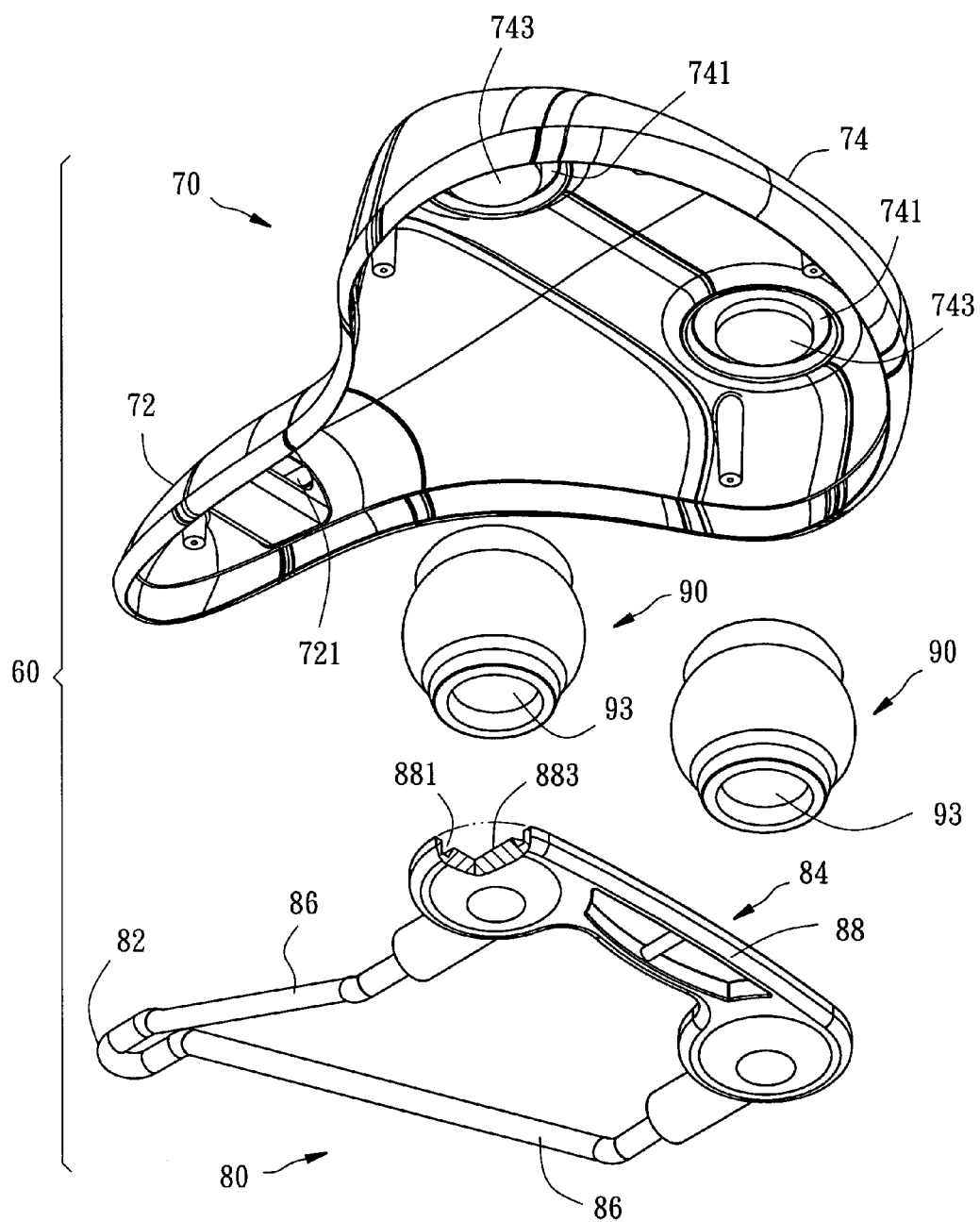
FIG. 5 is an exploded view of a second preferred embodiment of the present invention.
Figure 6:
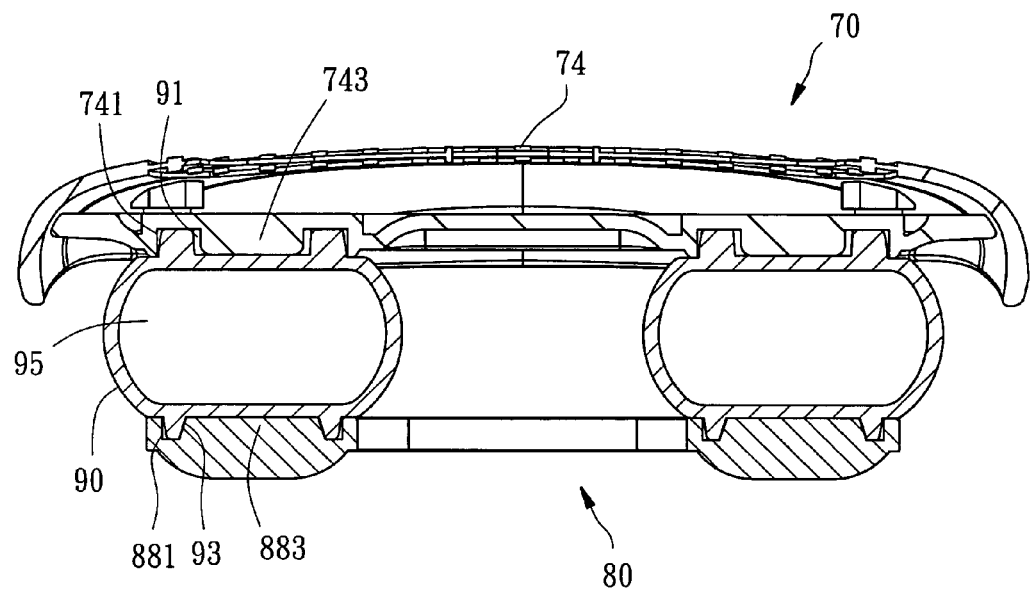
FIG. 6 is a sectional view of the second preferred embodiment of the present invention.
Figure 7:
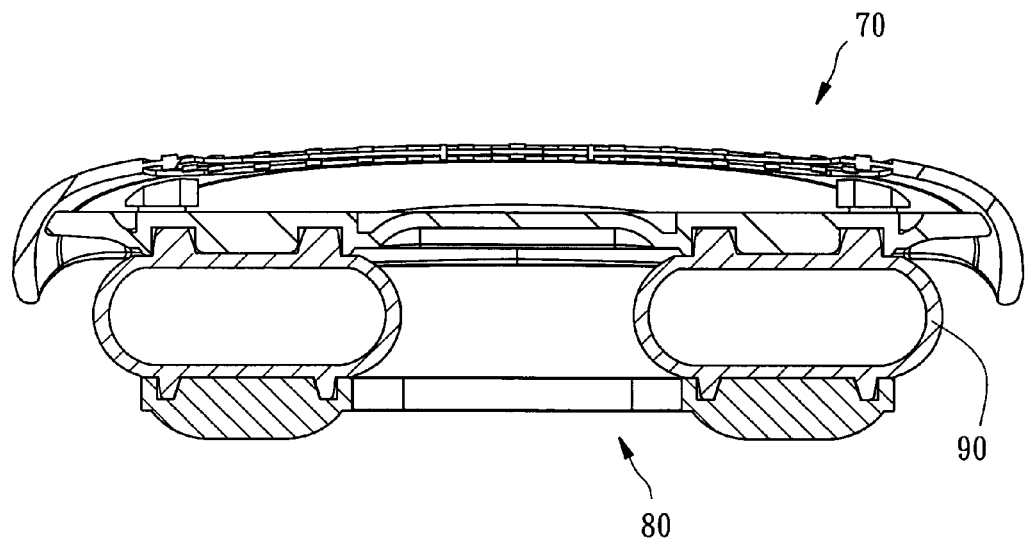
FIG. 7 is similar to FIG. 6 but showing that the pneumatic cushions are compressed.

Referring to FIGS. 5–7, the bicycle saddle 60 provided by the second preferred embodiment of the present invention is shown comprised of a saddle shell 70, a frame 80 and two pneumatic cushions 90.

The saddle shell 70 is similar to the saddle shell 20 of the first preferred embodiment, except that two short mounting posts 743 protrude downwardly respectively from the locating recesses 741 of the bottom side of the rear end 74.

The frame 80 has a U-shaped narrow front end 82, a wide rear end 84, two arms 86, and a bridge 88 connected between the free ends of the arms 86. The U-shaped front end 82 of the frame 80 is inserted into a socket 721 of the front end 72 of the saddle shell 70 so that the rear end 84 of the frame 80 is suspendedly located below the rear end 74 of the saddle shell 70. The bridge 88 of the frame 80 is provided at two lateral top sides thereof with two locating recesses 881 and two short mounting posts 883 protruding upwardly respectively from the locating recesses 881 and corresponding to the two short mounting posts 743 of the saddle shell 70.

The pneumatic cushions 90 each have a top locating recess 91 at a top side thereof, a bottom locating recess 93 at a bottom side thereof, and an enclosed airtight chamber 95 that is defined in between the outer peripheral wall and the top and bottom sides and filled with gas. The pneumatic cushions 90 are respectively disposed at between the rear end 74 of the saddle shell 70 and the rear end 84 of the frame 80 such that the mounting posts 743 of the saddle shell 70 are respectively received and located in the top locating recesses 91 of the pneumatic cushions 90, the mounting posts 883 of the frame 80 are respectively received and located in the bottom locating recesses 93 of the pneumatic cushions 90, and the top and bottom sides of the pneumatic cushions 90 are respectively received in the locating recesses 741 of the saddle shell 70 and the locating recesses 881 of the frame 80.

As shown in FIG. 7, the pneumatic cushions 90 are compressed and deformed to absorb the impact of the force acting on the saddle shell 70. As soon as the pneumatic cushions 90 are relieved of the external force exerting thereon, the compressed pneumatic cushions 90 return to their original shape, as shown in FIG. 6. The pneumatic cushions 90 provided by this embodiment also achieve the objectives of the present invention.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A bicycle saddle comprising:
   a saddle shell having a relatively narrower front end and a relatively wider rear end;
   a frame having a relatively narrower front end connected to a bottom side of the front end of the saddle shell, and a relatively wider rear end located below the rear end of the saddle shell;
   two pneumatic cushions spacedly disposed between a bottom side of the rear end of the saddle shell and the rear end of the frame, said pneumatic cushions each having therein an enclosed chamber that is filled with gas;
   two mounting members, each of the mounting members being connected between and on a respective pneumatic cushions and the rear end of the frame, the mounting members each having a peripheral groove, the rear end of the frame being provided with two hook portions each of which is hooked within the peripheral groove of the mounting members.

2. The bicycle saddle of claim 1, wherein the cushion body has a top side, a bottom side and an axial through hole through the top and bottom sides for insertion of a part of the bicycle saddle.

3. A bicycle saddle comprising:
   a saddle shell having a relatively narrower front end and a relatively wider rear end;
   a frame having a relatively narrower front end connected to a bottom side of the front end of the saddle shell, and a relatively wider rear end located below the rear end of the saddle shell;
   two pneumatic cushions spacedly disposed between a bottom side of the rear end of the saddle shell and the rear end of the frame, said pneumatic cushions each having therein an enclosed chamber that is filled with gas;
   two mounting members, each of the mounting members being connected between and on a respective pneumatic cushions and the rear end of the frame, the mounting members each have a plug portion, said pneumatic cushions each comprise a through hole into which one of the plug portions of the mounting members is inserted wherein the mounting members each have a peripheral groove, the rear end of the frame is provided with two hook portions each of which is hooked within the peripheral groove of the mounting members.

4. The bicycle saddle of claim 3, wherein the mounting members each further have a through hole, the saddle shell has two posts downwardly spacedly protruding from a bottom side of the rear end of the saddle shell and respectively extending into the through holes of the mounting members through the through holes of the pneumatic cushions, wherein said post is slidable and positionable in the through hole of the mounting member relative to the mounting member.

5. The bicycle saddle of claim 3, wherein the cushion body has a top side, a bottom side and an axial through hole through the top and bottom sides for insertion of a part of the bicycle saddle.

6. A bicycle saddle comprising:
   a saddle shell having a relatively narrower front end and a relatively wider rear end;
   a frame having a relatively narrower front end connected to a bottom side of the front end of the saddle shell, and a relatively wider rear end located below the rear end of the saddle shell;
   two pneumatic cushions spacedly disposed between a bottom side of the rear end of the saddle shell and the rear end of the frame, said pneumatic cushions each having therein an enclosed chamber that is filled with gas;
   a plurality of posts downwardly spacedly protruding from a bottom side of the rear end of the saddle shell, the pneumatic cushions each have a through hole into which one of the posts is inserted; two mounting members, each of the mounting members being connected on and between one of the pneumatic cushions and the rear end of the frame, wherein the mounting members each have a peripheral groove, the rear end of the frame is provided with two hook portions each of which is hooked within the peripheral groove of the mounting members.

7. The bicycle saddle of claim 6, wherein the mounting members each have a plug portion, said pneumatic cushions each have a through hole into which one of the plug portions of the mounting members is inserted.

8. The bicycle saddle of claim 7, wherein the mounting members each further have a through hole, the saddle shell has two posts downwardly spacedly protruding from a bottom side of the rear end of the saddle shell and respectively extending into the through holes of the mounting members through the through holes of the pneumatic cushions, wherein said post is slidable and positionable in the through hole of the mounting member relative to the mounting member.

9. The bicycle saddle of claim 6, wherein the bottom side of the rear end of the saddle shell is provided with two locating recesses, said pneumatic cushions each have a top side positioned in one of the locating recesses of the saddle shell.

10. The bicycle saddle of claim 6, wherein the cushion body has a top side, a bottom side and an axial through hole through the top and bottom sides for insertion of a part of the bicycle saddle.

11. A bicycle saddle comprising:
    a saddle shell having a relatively narrower front end and a relatively wider rear end;
    a frame having a relatively narrower front end connected to a bottom side of the front end of the saddle shell, and a relatively wider rear end located below the rear end of the saddle shell;
    two pneumatic cushions spacedly disposed between a bottom side of the rear end of the saddle shell and the rear end of the frame, said pneumatic cushions each having therein an enclosed chamber that is filled with gas;
    a plurality of posts downwardly spacedly protruding from a bottom side of the rear end of the saddle shell, the pneumatic cushions each have a top locating recess into which one of the posts is received wherein the frame has two mounting members with a post upwardly protruding from a top side of the rear end of the frame, the pneumatic cushions each comprise a bottom locating recess in which one of the posts is received.

12. The bicycle saddle of claim 11, wherein the plurality of posts include two posts.

* * * * *